United States Patent

[11] 3,632,129

| [72] | Inventor | Harold F. Bear<br>Route 2, Timberville, Va. 22853 |
|---|---|---|
| [21] | Appl. No. | 861,695 |
| [22] | Filed | Sept. 29, 1969 |
| [45] | Patented | Jan. 4, 1972 |

[54] TANDEM WAGON AXLE ASSEMBLY
10 Claims, 6 Drawing Figs.

[52] U.S. Cl................................................ 280/109, 280/140
[51] Int. Cl........................................................ B60g 25/00
[50] Field of Search............................................ 280/109, 113, 114, 115, 140; 296/42, 41

[56] References Cited
UNITED STATES PATENTS

| 3,515,405 | 6/1970 | Segar | 280/113 |
| 1,252,320 | 10/1918 | Carlson | 280/140 |
| 2,878,139 | 9/1932 | Hertner | 280/109 |
| 419,672 | 1/1890 | Herby | 280/109 |

Primary Examiner—Philip Goodman
Attorney—Bair, Freeman & Molinare

ABSTRACT: An axle assembly avoids lateral skidding of the tandem wheels of a vehicle when the vehicle is turning and includes an elongated beam upon which the wheels are rotatably mounted. The beam is rotatable relative to the centerline and body of the vehicle when the vehicle is turned and spring centering means is provided to return the beam to a position substantially perpendicular to the centerline of the vehicle.

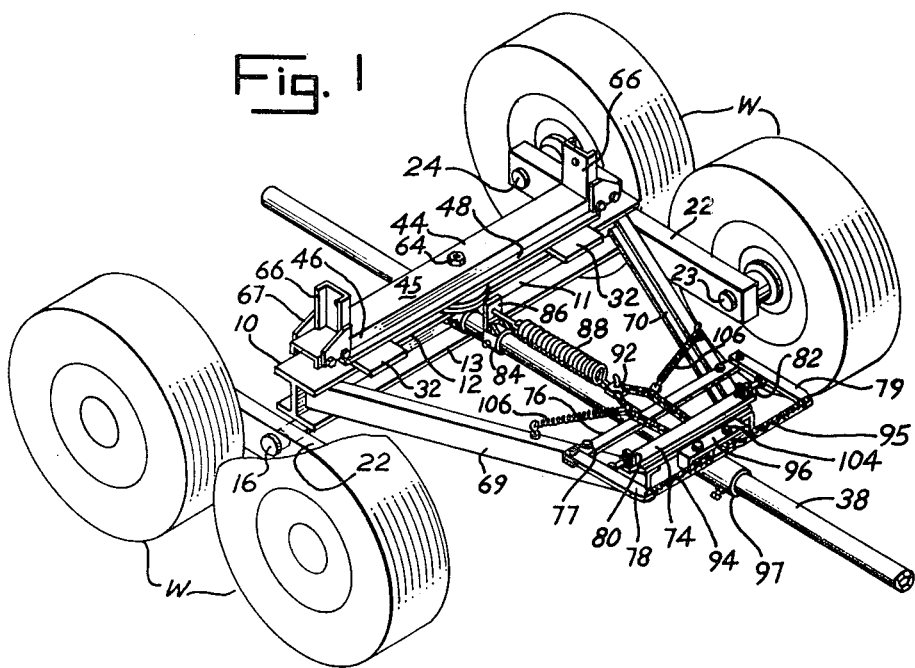

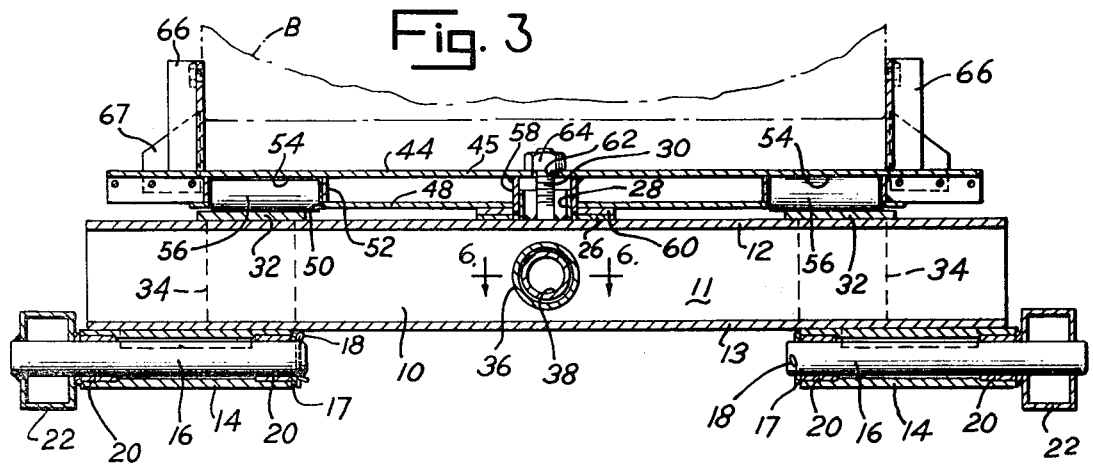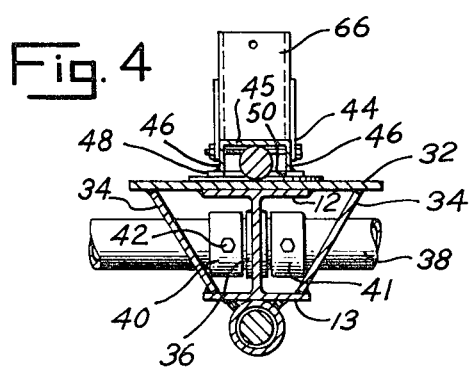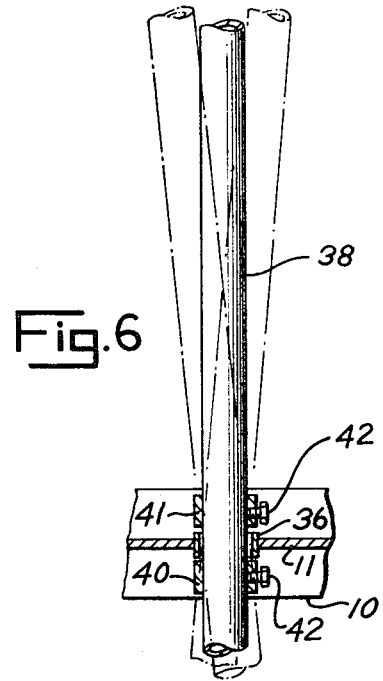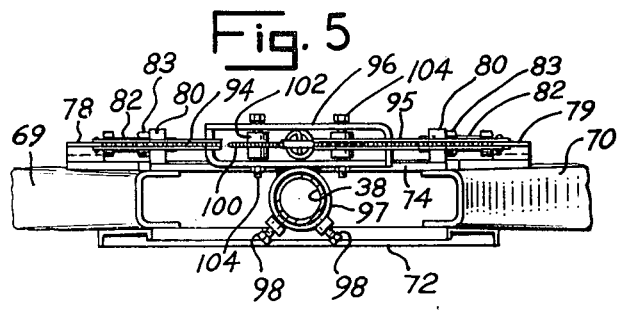

TANDEM WAGON AXLE ASSEMBLY

BACKGROUND OF THE INVENTION

This invention relates to a vehicle axle assembly and, more particularly to a tandem wagon axle assembly which avoids lateral skidding or slippage of the wheels of the wagon when the wagon is turned.

In prior vehicle assemblies, and particularly in tandem wagons in which the front and rear wheel axles are rigidly positioned relative to each other via a centerpole, excessive wear is experienced by the wheels and by the axle assembly in general, due to lateral skidding or slipping of the wheels when the vehicle is turned. Such skidding results from the fact that the tandem wheels of the vehicle are generally mounted to remain in continuous parallel relationship with respect to the centerline of the vehicle and when the centerline is angular displaced in the horizontal plane, such as when the vehicle is being turned, the wheels must rapidly slip laterally sidewise to maintain their parallel relationship.

In the axle assembly of my invention the wheels are able to move relative to the centerline of the vehicle such that when the centerline of the vehicle is horizontally displaced upon turning the vehicle, the wheels will not abruptly deviate laterally from their prior path of advance but will temporarily deviate from their parallel relationship to the centerline and will gradually follow a relatively large arcuate path in returning to parallel relationship with the centerline. In the axle assembly of my invention, a spring centering assembly is provided which urges the tandem wheels of the vehicle into parallel relationship with the centerline of the vehicle but yet allows the wheels to deviate from such relationship upon turning of the vehicle to enable the wheels to negotiate a smooth arcuate path of travel during the turn. Such path of travel avoids abrupt lateral slippage of skidding of the wheels and the incident frictional wear upon the wheel and the lateral stresses upon the axle which would result from such abrupt lateral skidding.

These and other objects, features and advantages of the present invention will be more clearly understood through a consideration of the following detailed description.

BRIEF DESCRIPTION OF THE DRAWING

In the course of this description, reference will frequently be made to the attached drawings in which:

FIG. 1 is a perspective view of a rear axle assembly of a tandem wagon which is constructed in accordance with the principles of my invention and in which the body of the vehicle and front axle have been removed;

FIG. 2 is a plan view of the axle assembly of FIG. 1;

FIG. 3 is a cross-sectioned rear elevation view of the axle assembly taken substantially along line 3—3 of FIG. 2;

FIG. 4 is a cross-sectioned side elevation view of the axle assembly taken substantially along line 4—4 of FIG. 2;

FIG. 5 is a frontal elevation view of the axle assembly taken substantially along line 5—5 of FIG. 2; and FIG. 6 is a broken cross-sectioned plan view of the axle assembly of my invention showing the attachment of the centerpole of the wagon to the axle beam.

DESCRIPTION OF THE PREFERRED EMBODIMENT

The axle assembly shown in the drawings is, by way of example, the rear axle of a tandem wagon of the type employed in farm use and the like. In such wagons the front and rear axles are generally connected together by way of a centerpole which extends beneath the body or bed of the wagon and substantially parallel to the centerline of the wagon and its body. In the usual prior construction, the centerpole is rigidly connected between the front and rear axles of the wagon such that the rear axle and the centerpole are continuously positioned in perpendicular intersecting relationship to each other. Thus, when the wagon is moving in the forward direction and is then turned, the centerline of the vehicle and its parallel centerpole will be angularly displaced about their points of intersection with the rear axle. Since the centerpole is rigidly connected with the rear axle, the rear axle will also be abruptly angularly rotated about a pivot axis which passes through said point of intersection as the centerpole follows the centerline of the vehicle, causing the rear tandem wheels to abruptly slip or skid laterally sidewise. The axle assembly of my invention provides for angular relative movement between the centerline and/or centerpole of the wagon and the rear axle to avoid lateral skidding of the wheels as will become clear in the description which follows.

The axle assembly of my invention includes a rigid axle beam 10 which is preferably an H-beam having a vertical web 11 and a pair of horizontal flanges 12 and 13. As shown in FIG. 3, a pair of tubular trunnion housings 14 are rigidly attached to the underside of the beam flange 13 at its ends and extend in parallel relationship to the axis of the beam. A trunnion axle 16 is rotatably journaled through each of the trunnion housings and each of the axles are retained therein by a retainer ring 17 which abuts the inner ends of the trunnion housings and a cotter pin 18 which passes through the inner end of the trunnion axles to prevent lateral movement of the axles. Trunnion bearings 20 are provided within the trunnion housings between the housing and the trunnion axle to enable the axle to rotate about the axis of the axle. Attached to the outer end of each of the trunnion axles 16 is a trunnion 22 which carries forward 23 and rear 24 wheel axles at each of its ends upon which the tandem rear wheels W of the vehicle are mounted for rotation.

A substantially circular pivot plate 26 is firmly attached at the center of the upper flange 12 of the beam. The pivot plate is annular and includes an upstanding cylindrical sleeve 28 which forms a pivot bearing as will be described more fully hereafter. A pivot stud 30 is also firmly attached in the center of the upper flange, as by welding, and extends upwardly concentrically within the sleeve 28.

A pair of spaced flat rectangular roller plates 32 are also attached to the upper face of flange 12, to form roller bearing plates. The axis of each of the plates 32 is generally perpendicular to the axis of the beam 10 and the ends of each of the plates overhang flange 12. Rigid braces 34 may be welded between the ends of the roller plates 32 and the lower flange 13 of the beam to provide additional structural support to the plates as shown in FIG. 4.

A centerpole bushing 36 is also provided in the center of web 11 of beam 10. The centerpole bushing 36 is of slightly larger diameter than the centerpole 38, as clearly shown in FIGS. 3 and 6. The centerpole 38 passes through the centerpole bushing 36 and a pair of retaining sleeves 40 and 41 are positioned to each side of the centerpole bushing and are bolted in place upon the centerpole by bolts 42 to prevent fore and aft movement of the centerpole. Each of the sleeves are spaced slightly from the centerpole bushing 36 such that when combined with the somewhat increased diameter of the bushing relative to the diameter of the centerpole, some lost motion in the centerpole is made possible so that the axis of the centerpole may be angularly varied in relation to the beam, as shown by the dot and dash lines in FIG. 6. The rear end of centerpole 38 may carry a hitch or the like (not shown) for hitching another wagon to the axle assembly.

An elongated bolster 44 is positioned upon the top side of the beam 10. The bolster comprises a generally channel shaped member having a web 45 and a pair of downwardly extending flanges 46. An elongated plate 48, having a width somewhat wider than web 45, covers the open face of the channel and is welded to the flanges 46 along their length. A pair of rectangular apertures 50 are provided adjacent each end of the plate 48 and a plurality of short strong members 52, as shown in FIG. 3, are welded between the web 45 and flanges 46 of the channel and the plate 48 adjacent the periphery of its apertures 50 to form an enclosed roller retainer housing 54 adjacent each end of the bolster and in vertical alignment with the roller plates 32. An elongated cylindrical roller 56 is positioned in each of the housings 54 in rollable contact with the roller plates 32 and the lower face of the web 45 of the bolster 44.

A cylindrical sleeve 58 is also welded to the underside of bolster web 45 and is of slightly larger diameter than the sleeve 28. An annular pivot plate 60 is concentrically mounted about the lower end of sleeve 58 and is rigidly attached to the underside of plate 48. The bolster 44 is positioned vertically above the beam 10 and is rotatably attached to the beam by way of stud 30 which extends upwardly through the sleeves 28 and 58 and an aperture 62 in the center of the bolster and a nut 64 is threaded down upon the end of the stud to rotatably affix bolster 44 to beam 10. The sleeve 28 is telescopically received within sleeve 58 to form a bearing surface therewith and plates 26 and 60 likewise provide cooperating bearing surfaces.

A vertically extending stake 66 extends upwardly adjacent each end of the bolster and each stake is rigidly attached to the bolster as by welding and/or by gusset plates 67. The body or bed B of the vehicle is mounted to the bolster by way of each of the stakes as shown in the dot and dash lines in FIG. 3.

A pair of reach beams 69 and 70 extend forward from the beam 10 and are rigidly attached at one of their ends between the flanges 12 and 13 of the beam. The reach beams are of rigid channel construction and are inclined to each other such that the forward ends are positioned substantially closer to each other than the beam ends. Referring particularly to FIG. 5, the forward ends of the reach beams 69 and 70 are firmly connected together by a bottom spacer plate 72 and a top anchor bar 74. The width of the webs of the channel reach beams is such that when the bottom spacer plate 72 and the top anchor bar 74 are attached between the webs of the beams, the plate and bar are separated by a distance sufficient to allow the centerpole 38 to freely pass therebetween and be movable in the horizontal between the ends of the reach beams 69 and 70.

A second elongated bar 76 is rigidly attached to the upper flanges of the reach beams, as by bolts 77, and is spaced somewhat to the rear of the anchor bar 74. A pair of elongated centering arms 78 and 79 are pivotally mounted at the end of bar 76 and extend forward of the bar. An adjusting block 80 extends vertically upward from the anchor bar 74 at each of its ends and is apertured to receive a threaded adjusting bolt 82 which is mounted such that its head bears against the centering arms 78 and 79 intermediate their ends for adjusting the centering arms relative to the blocks 80. A locking nut 83 is provided on each of the adjusting bolts to lock the bolt in its adjusted position once the centering arms have been adjusted relative to the adjusting blocks 80.

A centering spring mounting bracket 84 is telescopically positioned on the centerpole and bolted to the centerpole 38 forward of the beam 10. The mounting bracket 84 includes an upstanding flange 86 and a centering spring 88 is mounted at one end by way of an eye bolt 90 to the flange. The spring extends forward substantially parallel to the centerpole and is attached at the other end to a yoke 92. A pair of sprocket chains 94 and 95 are attached at one of their ends to the yoke 92 and at their other ends to the ends of the centering arms 78 and 79 respectively.

Referring particularly to FIG. 5, a sprocket housing 96 is rigidly mounted upon the centerpole 38 forward of the ends of the reach beams 69 and 70 by way of a tubular bushing 97 which is telescoped over the centerpole and bolted in place by bolts 98. The sprocket housing is generally rectangular in shape and a pair of sprockets 100 and 101 are pivotally mounted in spaced relationship to each other within the housing in substantially the same plane as the axis of the centering spring 88. The sprockets are spaced from the walls of the housing by way of sprocket spacers 102 and a rotation axis is provided by bolts 104 which extend vertically downward through the sprocket housing. Each of the sprocket chains 94 and 95 are trained about respective ones of the sprockets 100 and 101 as shown in FIGS. 2 and 5.

A pair of light tension springs 106 are preferably provided which extend between the sprocket chains 94 and 95 adjacent the yoke 92 and the reach beams 69 and 70 to keep excessive slack out of the chains when the vehicle is being turned.

A description of the operation of the axle assembly above described now follows.

Preliminarily, the adjusting bolts 82 are so adjusted as to individually laterally pivot the centering arms 78 and 79 to take up or slack their respective sprocket chains 94 and 95 such that an equal tension is drawn upon each of the chains. When the tension in each chain is equal, equal opposite lateral forces will be exerted upon each of the reach beams 69 and 70 through their centering arms 78 and 79 by the chains and the centering spring 88 so that the centerpole is centered between the forward ends of the reach beams as shown in the solid line depiction in FIG. 2. In such position the axis of the bolster 44 and the beam 10 are substantially parallel to each other and extend generally perpendicular to both the centerline of the vehicle and the centerpole 38.

Now when the vehicle is moved in the forward direction and a turn is negotiated, the centerpole 38 will rotate angularly to the dot and dash line position shown in FIG. 2 since the centerpole will remain parallel to the centerline of the vehicle at all times. If the centerpole was rigidly attached to the beam 10, the centerpole would rotate the beam such that the beam would remain perpendicular to the centerpole. Such abrupt rotation of the beam would cause the tandem wheels W to abruptly slip sideways, as shown by way of example by the dotted arrows in FIG. 2. This lateral skid or slip of the wheels takes place rather abruptly resulting in lateral forces which are exerted upon the wheels and axle assembly and causing the wheels to frictionally drag upon the pavement.

However, the centerpole 38 of my assembly is loosely journaled through the beam 10 such that the centerpole may angularly vary with respect to the beam upon turning the vehicle. Thus when the centerpole 38 is angularly displaced upon turning of the vehicle, the disposition of the beam 10 remains substantially unchanged and continues to be positioned in relatively the same position as it was during its course of travel before the turn was commenced. Therefore the wheels continue to proceed in the original direction of travel.

The angular movement of the centerline of the vehicle bed or body B is also isolated from the beam by way of the pivotally mounted bolster 44 which will rotate to the dot and dash line position shown in FIG. 2, upon turning of the vehicle. The bolster rotates upon the beam 10 about the pivot bearings provided by sleeves 28 and 58 and the pivot plates 26 and 60. Upon such relative angular movement, the roller bearings 56 will roll upon the roller plates 32 to rollably support the bed during the angular movement.

Upon negotiation of a turn to the left by way of example as illustrated in FIG. 2, centering spring 88 and its yoke 92 will be caused to rotate to the left following the movement of the centerpole. Since the centering arms 78 and 79 have remained stationary thus far, movement of the yoke to the left will tend to slack sprocket chain 95 and draw a tension on sprocket chain 94 which, in turn, results in a tension being drawn on the centering spring 88. The tension exerted by the centering spring exerts a force through the chain 94 upon the centering arm 78 and, since the centering arm 78 is mounted to the reach beam 69 by way of bar 76, the reach beam tends to be moved in a counterclockwise direction as viewed in FIG. 2. As the reach beam 69 rotates, it also rotates the beam 10 of the vehicle to which it is rigidly attached in a counterclockwise direction changing the course of travel of the wheels W. The beam 10 will thus continue to rotate in the counterclockwise direction until the centerpole has again been centered between the forward ends of the reach beams 69 and 70. In such position, the sprocket chains 94 and 95 are again at equal tension and rotation of the beam stops.

Since the change in the direction of travel of the wheels is directly responsive to the rotation of the beam 10 as effected by the tensioning of the centering spring 88, the wheel movement will follow a smoother arcuate path and the wheels will be able to more easily accommodate to the change in vehicle direction without substantial side slippage. This arcuate path of travel is shown by way of example by the solid arrows in FIG. 2.

It should be understood that the embodiment of the present invention which has been described is merely illustrative of one application of the principles of the invention. Numerous modifications may be made by those skilled in the art with departing from the true spirit and scope of the invention.

What is claimed is:

1. A vehicle axle assembly for permitting relative movement between the wheels of the vehicle and the centerline of the vehicle when the vehicle is turning, said assembly comprising:
   an elongated beam having wheel mounting means for mounting a vehicle wheel at each end of said beam for rotation about an axis which is substantially parallel to the axis of said beam,
   pivotal mounting means rotatably mounting said beam to the body of the vehicle such that the axis of said beam and the centerline of the vehicle are angularly moveable relative to each other when said vehicle is turning, and
   spring centering means for urging said beam into a position in which the axis of the beam is substantially perpendicular to the centerline of the vehicle.

2. The assembly of claim 1 including an elongated bolster to supportably mount the body of the vehicle upon said beam and extending substantially perpendicular to the centerline of the vehicle, said pivotal mounting means mounting said bolster and said beam for rotation relative to each other when the vehicle is turned.

3. The assembly of claim 1 including roller support means for rollably supporting the body of the vehicle upon said beam.

4. The assembly of claim 3 including an elongated bolster to supportably mount the body of the vehicle upon said beam, said pivotal mounting means mounting said bolster and said beam to each other intermediate their ends for rotation relative to each other, and said roller support means comprises a roller positioned between said bolster and said beam adjacent the ends thereof for rollably supporting said bolster on said beam during said relative rotation.

5. The assembly of claim 1 including a centerpole extending substantially parallel to the centerline of said vehicle and mounted on said beam for movement relative to said beam in a plane substantially parallel to the plane of the axis of said beam, said spring centering means being connected at one end to said centerpole and at the other end to said beam and exerting a force in a direction substantially parallel to the axis of said beam such that said beam is rotatably urged toward a position in which the axes of the beam and the centerpole are substantially perpendicular to each other.

6. The assembly of claim 1 wherein said spring centering means comprises:
   a spring,
   a pair of flexible members each attached at one end to said spring and at their other ends to the ends of said beam, and
   a pair of rotatable means mounted stationary relative to the centerline of the vehicle, each of said flexible members being trained about one said rotatable means intermediate their length, whereby when the vehicle is turned one of said flexible members is slacked and a tension is drawn on the other of said flexible members and said spring for urging said beam toward said position in which the beam is substantially perpendicular to the centerline of the vehicle.

7. The assembly of claim 6 wherein said flexible members are chains and said rotatable means are toothed sprockets.

8. The assembly of claim 6 including spring means attached between said flexible members and said beam.

9. The assembly of claim 6 including means for individually adjusting the tension on each of said flexible members.

10. The assembly of claim 1 wherein said spring centering means is coupled to said beam for exerting a force on said beam to urge said beam into said position.

* * * * *